April 20, 1954  R. L. JAESCHKE  2,676,280
ELECTRIC COUPLING AND CONTROL
Filed Dec. 19, 1951  3 Sheets-Sheet 1

Ralph L. Jaeschke,
Inventor.
Koenig and Pope,
Attorneys.

April 20, 1954   R. L. JAESCHKE   2,676,280
ELECTRIC COUPLING AND CONTROL
Filed Dec. 19, 1951   3 Sheets-Sheet 2

April 20, 1954     R. L. JAESCHKE     2,676,280
ELECTRIC COUPLING AND CONTROL
Filed Dec. 19, 1951     3 Sheets-Sheet 3

Ralph L. Jaeschke,
Inventor.
Koenig and Pope,
Attorneys.

Patented Apr. 20, 1954

2,676,280

UNITED STATES PATENT OFFICE 2,676,280

ELECTRIC COUPLING AND CONTROL

Ralph L. Jaeschke, Kenosha, Wis., assignor, by mesne assignments, to Eaton Manufacturing Company, Cleveland, Ohio, a corporation of Ohio Application December 19, 1951, Serial No. 262,453

7 Claims. (Cl. 310—95)

This invention relates to electric couplings and controls, and more particularly, to couplings and speed controls particularly adapted for driving conveyors and like apparatus which ordinarily have relatively poor regulation, so that a proper division of load is obtained when the apparatus is driven from more than one drive.

Among the several objects of the invention is the provision of simple and compact, easily-installed, low-cost and long-life electric couplings and controls for driving conveyors and the like which normally have relatively poor regulation, i. e., relatively large speed charges between full and fractional loads.

The couplings of the invention have driven members adapted to be telescoped over stub shafts, such as the drive shafts of transmissions for conveyors. The driving member of each coupling is journaled on the driven member and is belt-driven by a prime mover. The entire support for the coupling is the stub shaft. A generator, preferably of the type having a sharply rising voltage characteristic, such as an automotive generator, or the like, is belt-driven by the driven member of the coupling. The coupling consequently is a substantially self-contained unit adapted to be slipped over and supported upon any shaft such as the stub shaft mentioned. Brushes for energizing the coupling are fixed, as by a support from the respective transmission. Several drives and controls may be conveniently applied to driving a conveyor system, the regulation being designed to allow each reliably to assume its frictional part of the load.

As to each unit I have provided a quill, at one end of which is supported an inductor drum and at the other end axially spaced bearings. The supports for the drum also form air-circuiting means. A field member has a sleeve portion journaled on the bearings and a cup portion carrying a field coil and enclosing teeth arranged to sweep the inductor drum. Radial air ports are located adjacent the teeth for ejecting air moved across the inductor drum by the air-circulating means. A sheave connected with the cup portion provides for a belt-driving connection with a prime mover. Slip rings connected to the field coil are located adjacent this sheave and a second sheave is carried by the quill adjacent the slip rings.

Briefly, the control elements comprise a D. C. power source of constant voltage connected in series opposition with a D. C. shunt-field generator to force current through the generator armature and coupling against the voltage developed by the generator. An automotive generator of this type is economical to obtain and has favorable electrical characteristics for the purpose. Equivalent generators may be used. An adjustable resistance is series-connected with the shunt field of the generator to vary the critical value of speed at which the generator builds up voltage, and thereby to provide speed control. A second adjustable resistance is connected in the energizing circuit for the coupling to provide a torque-limiting control action and thereby protect the apparatus against stalling. Other features will be in part apparent and in part pointed out hereinafter.

The invention accordingdy comprises the elements and combinations of elements, features of construction, and arrangement of parts which will be exemplified in the structures hereinafter described, and the scope of which will be indicated in the following claims.

In the accompanying drawings, in which one of various possible embodiments of the invention is illustrated, Fig. 1 is a top plan view illustrating the coupling and parts of the control therefor;

Similar reference characters indicate corresponding parts throughout the several views of the drawings.

Figure 1:
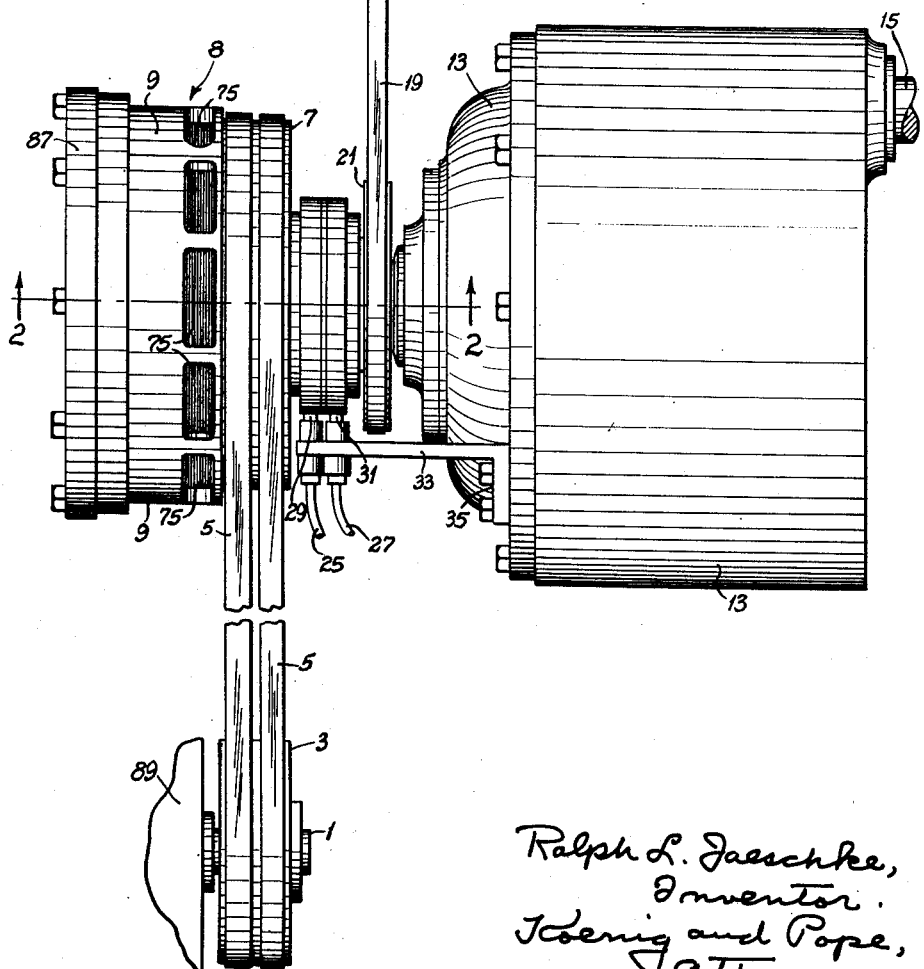

Referring to Fig. 1, there is shown a motor driving shaft 1 having a sheave 3. Belts 5 are trained around the sheave 3 and a sheave 7 formed on a driving member 9 of an electric coupling 8. The coupling has a rotary inner driven member 10 (Figs. 2 and 3) fitted over and keyed to a stub input shaft 11 of a speed reducer transmission 13, such as is usually used for conveyor and like drives. An output shaft of the speed reducer to the conveyor is indicated at 15. There may be several shafts such as 15 in a given conveyor system, each carrying a drive and control made according to the invention. The speed of the output shaft 15 is controlled to the necessary extent by varying the slip in the coupling.

A control for regulating the driven speed of the apparatus includes a shunt-field type generator 17 having a sheave 18; as for example, an automotive type generator. The generator is driven by a belt 19 which is trained around the sheave 18, and a sheave 21 carried by the driven member 10 of the coupling. This control provides a suitable excitation for the coupling through connections at 25 and 27 to brushes 29 and 31, respectively, carried on a bracket 33 fastened at 35 on the housing of the transmission 13.

Figure 2:
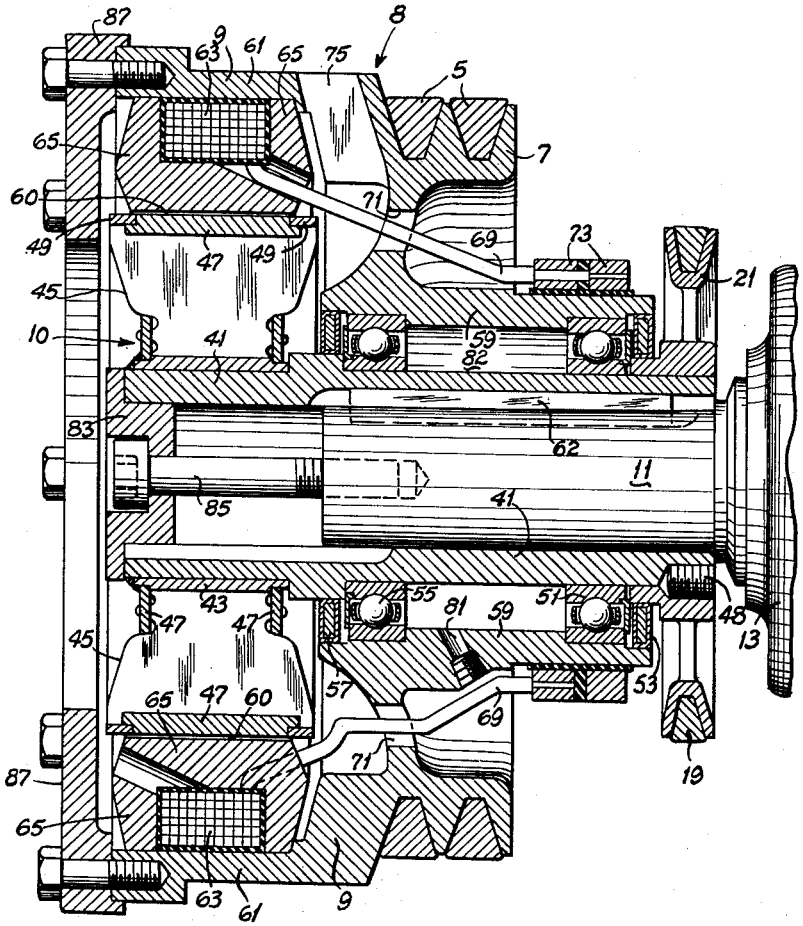
Fig. 2 is an axial section of the coupling taken on line 2—2 of Fig. 1.

Referring to Fig. 2, the driven member 10 of the coupling comprises a quill 41 adapted to be telescoped over and keyed to the stub input shaft 11 of the speed reducer. A sleeve 43 is fastened to one end of the quill 41 and spaced struts or spokes 45 fastened by end plates 47 extend radially from the sleeve 43. These struts carry an inductor drum 47 having conductive end rings 49. A more detailed description of this type of drum construction may be found in my copending application Serial No. 184,599, filed September 13, 1950, and entitled Inductor Drum Construction for Electrical Machines, eventuated as Patent No. 2,641,722.

The sheave 21 is fixed on the other end of the quill 41 by a set screw 49. Adjacent the sheave 21 is a ball bearing generally designated 51. A shaft seal 53 is located between the roller bearing 51 and the sheave 7. Axially spaced from the bearing 51 and adjacent the inductor drum is a second ball bearing 55. A second shaft seal 57 is carried between the bearing 55 and the inductor drum parts.

These bearings 51 and 55 support the driving member 9 of the coupling, which comprises a sleeve portion 59 journaled on the bearings and a cup portion 61 formed integrally with the sleeve portion 59 to extend in spaced relation around the inductor drum 47. On the inner surface of the cup 61 is a field coil 63. Interdigitated teeth 65 enclosing the field coil are secured to the cup 61 in position to sweep the outer face of the inductor drum. Between the teeth and the drum is a small annular magnetic gap 69. A detailed description of such teeth may be found in United States Patent No. 2,470,596, entitled Toroidal Magnet Field for Dynamoelectric Machines.

It will be understood that the polar fields from teeth 65 generate eddy currents in the inductor drum (assuming relative movement) which produce a reactive field providing the force for transmission of torque from the driving field member 9 to the driven inductor member 10. The relative movement required is called slip. The torque transmitted between the two members is determined by the excitation of the field coil 63. Conductors 69 lead from the field coil 63 through apertures 71 in the cup portion 61 to collector rings 73 mounted in insulated relation upon the sleeve portion 59 between the sheaves 7 and 21 and cooperate with the brushes 29 and 31.

Radially opening air ports 75 are formed in the cup portion inwardly adjacent the teeth 65 to provide for ejection of air circulated between the spaced struts 45. A port 81 opens into a chamber 82 between the bearings 51 and 55, the quill 41 and the sleeve 59. This chamber 82 is adapted to be filled with grease for lubrication of the unit.

The unit is readily telescoped over the end of the stub shaft 11 in keyed relation (see key 62) and fastened by means of a plug or clamping member 83 and a cap screw 85 threaded into the shaft 11. An open cap 87 may be fastened over cup 61. As pointed out heretofore, only the brushes 29 and 31 and their mounting are separate items of assembly of the coupling 8. Consequently, the apparatus is compact and readily installed. It will be noticed that the continuously driven field member functions to pump cooling air through the inductor drum struts 45 even when the inductor drum is stationary.

Figure 3:
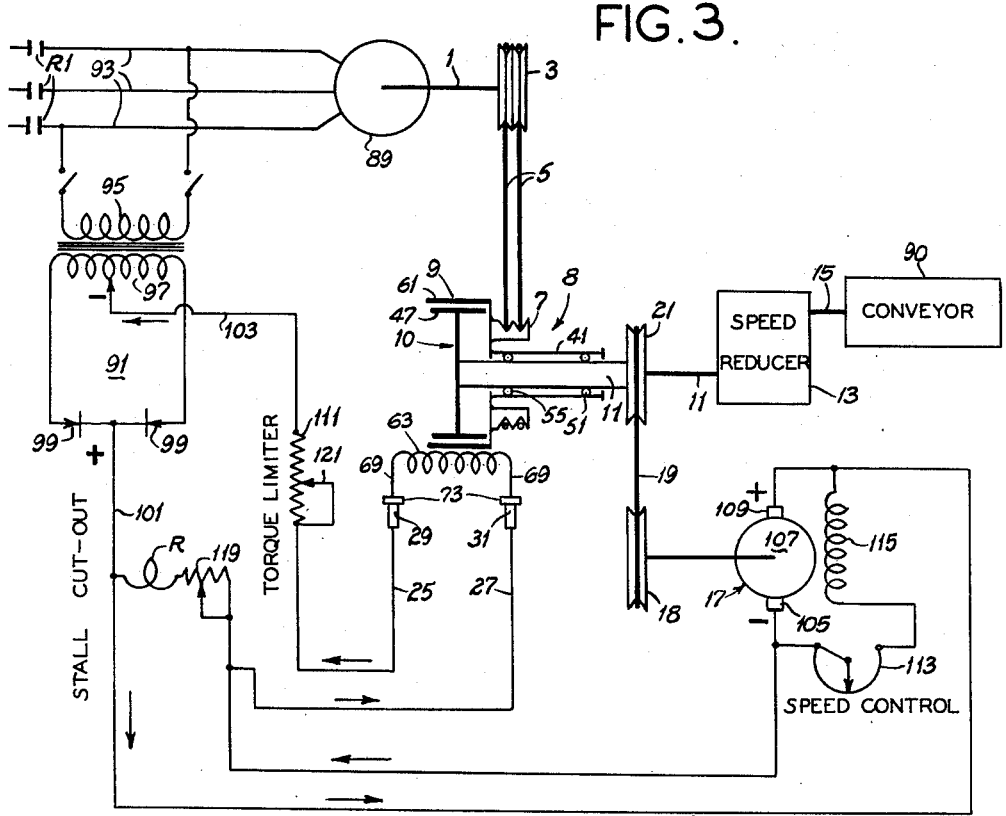
Fig. 3 is a schematic view and circuit diagram illustrating the control of the invention.

A cooperating control particularly adapted for applications such as conveyor drives is shown in Fig. 3. A conveyor 90 is driven by a prime mover 89 (herein a constant-speed A. C. motor) at various speeds selected and regulated by the coupling 8 and its control.

This control comprises a D. C. power source generally designated 91 in the form of a full-wave rectifier circuit energized from the A. C. power supply lines 93 for the A. C. motor 89. A primary 95 of a step-down transformer is connected to the power lines 93 and a center-tapped secondary 97 forms a part of the power source 91. The secondary 97 is connected at its ends through oppositely arranged rectifiers 99 to a positive output conductor 101. A conductor 103, center-tapped to the secondary 97, forms the negative output terminal of the D. C. power supply.

The positive conductor 101 carrying D. C. is connected to one brush 109 for an armature 107 of the generator 17. The generator has its other brush 105 connected to the lead 27 for exciting the field coil 63 of the coupling. The other lead 25 from the field coil 63 is connected to an adjustable torque-limiting resistor 111, which in turn is connected to the negative side 103 of the D. C. power source. An energizing circuit for the coupling is thereby formed to include the D. C. power source 91, the generator armature 107, the coupling field coil 63 and the torque-limiting resistor 111. The latter has a low resistance which, however, is slightly greater than the resistance of the field coil 63; for example, the maximum resistance of 111 might be 2 ohms.

Speed control is obtained by connecting an adjustable resistance or rheostat 113 in the shunt field circuit of the generator, it being understood that an automotive type generator has a shunt-connected field such as 115. This rheostat 113 may be located for remote control. To protect the apparatus against the effects of jams or stalling of the conveyor, an under-voltage relay having a relay coil R is series-connected with an adjustable resistor 119 across the armature 107 of the generator. The relay actuates normally open switches R1 connected in the power line 93, which are closed when the generator is operating, to deliver a normal voltage, but which open to disconnect the motor and control when the voltage drop across the armature 107 falls below a predetermined value. Adjustment is made at resistance 119 to cause the relay switches R1 to open when the voltage drop across the armature falls to a value determined by the current flowing from source 91 and the resistance of the armature 107. When the generator is rotating, the generated voltage of the generator will maintain the switches R1 closed. The switches R1 may be manually closed during starting.

The generator connections are made such that the output of the generator opposes that of the power source 91, i. e., the brush 109 should be positive with respect to the brush 105.

In order to facilitate an understanding of the operation, it will be assumed that the D. C. output of power source 91 is eight volts, that the resistance of the coupling field winding 63 is 0.4 ohm and that the output of the generator 107 varies with the speed from zero to eight volts. The manner in which the generator output varies will be described subsequently. The exciting voltage for the coupling is the output of the voltage source 91 less the voltage output of the generator 17 and less the voltage drop across the torque-limiting resistor 111. If the torque-limiting resistor 111 is completely shunted out by its adjusting arm 121, then the maximum exciting current for the coupling occurring when the generator output is zero will be twenty amps. As the torque-limiting resistor 111 is adjusted to offer increasing resistance, the maximum exciting current for the coupling is reduced and the maximum torque transmitted by the coupling is accordingly decreased. For example, if the torque-limiting resistor offers a resistance of 0.4 ohm, then the maximum excitation for the coupling is ten amps.

The maximum coupling excitation necessarily occurs only when the conveyor is (or tends to) jam or when the speed of the generator is reduced to such a value that its output is only nominal. During normal operation, the generator 17 develops a voltage which opposes the fixed D. C. voltage from the source 91. Consequently, the net field exciting voltage for the coupling is an inverse function of the generator speed. As the speeds of the driven member 10 and of generator 17 increase, the generator output increases and the net voltage is reduced, thereby reducing the exciting current for the coupling and correcting for the speed increase.

Figure 5:
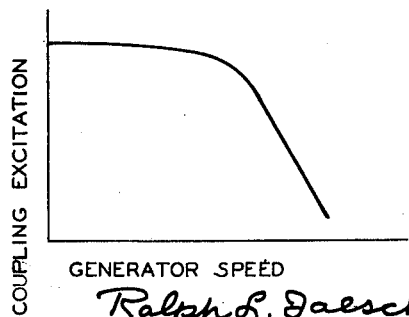

The coupling itself has some speed-regulating action in that the torque transmitted is a function of the slip. The control of this invention improves the speed regulation by varying the energization of the coupling in accordance with speed variations resulting from load changes. The amount of change in coupling excitation for a typical unit at a particular pre-selected speed with the torque varying from 0 to 15 lb.-ft. is shown in Fig. 5. From this plot, it will be noted that the field excitation increases considerably as the speed falls off. This desirable action is obtained from the particular type of generator employed.

Figure 4:
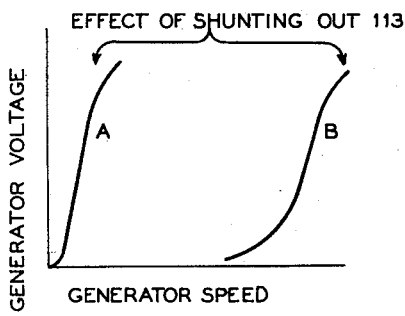
Fig. 4 is a chart showing representative speed-voltage characteristics for different values of field circuit resistance of the automotive type generator used in this control; and, Fig. 5 is a plot of the field excitation of the coupling as a function of generator speed through load variations for a particular speed setting.

Referring to Fig. 4, it will be observed that the generator output voltage is a non-linear sharply rising characteristic of the generator speed. This is a characteristic common to the shunt-field automotive type generator wherein the maximum voltage must be developed at relatively low speeds as well as at relatively high speeds. The curve A of Fig. 4 is representative of a condition wherein the rheostat 113 is adjusted to shunt out all of its resistance so that the resistance of the generator field circuit is a minimum. In this event, the generator output builds up sharply at low speeds. As resistance is added to the shunt field circuit at rheostat 113, the critical speed of the generator is increased, as for example, shown by curve B.

In an experimental installation using a commercial generator of the type used on trucks, full voltage was obtained through a speed range of from 500 to 3000 R. P. M. Consequently, the speed range in this case is six-to-one. In other words, the sensitivity of this control over the whole speed range is many times what it would be in the case of a straight-line relationship between the generator output and the generator speed throughout the speed range. The speed control from the A or B characteristic is due to the self-exciting nature of the generator, and is shifted by varying the net resistance of the field circuit.

The generator must of course have a capacity equal to the maximum exciting current to be employed but preferably it is greater than maximum field current in order to assure long generator life. In the example given, the generator might have a capacity of 32 amps, which is a typical value for automotive generators used on trucks.

If the conveyor stalls due to jamming or the like, it is undesirable to have the maximum current continue to flow through the armature for any great length of time. This situation is avoided by the provision of the relay R which operates to deenergize the system when the output voltage of the generator falls below a predetermined value, as upon excessive speed reduction through the coupling. The system may be deenergized by disconnecting the power supply 91 or by disconnecting the power to the prime mover 89, or both. The resistor 119 should be adjusted to prevent undesired cutout such as might occur in changing from a high speed to a low speed.

In view of the above, it is clear that the control combines a D. C. power source 91, a shunt-field generator 17, a field circuit rheostat 113, a torque-limiting resistor 111 and an undervoltage relay so organized that considerable savings may be made in using this type of control in preference to other types such as electronic controls. The speed regulation at 1000 R. P. M. under a load torque change of 0 to 15 lb.-ft. may be 10%, which is satisfactory for the type of service intended. In this example, the speed was variable from 400 R. P. M. to 1720 R. P. M. with some fall-off in the regulation at these extremes. It will be understood that conveyor drives should not have too fine a speed regulation if a proper division of load is to be obtained between several drives for one conveyor application.

One feature of the invention lies in its economy, particularly when more than one drive unit is used on a given conveyor system. Each torque limiter 111 limits the torque which the motor 89 of one unit is called upon to supply. When that limit is reached for a given motor it is insured that another motor of another unit will assume its fractional part of the load. It will be seen that it is needless to have such a refined regulation that the loads on the several motors are at all times balanced. The present invention thus provides for an effective drive requiring less expensive control equipment.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A controlled power-transmission, one or more units of which are adapted respectively to form driving connections between one or more prime movers and individual stub drive connections of driven apparatus having normally poor speed regulation in response to load; each unit comprising a generator, an assembled electric slip coupling having a belt drive with one of said prime movers, a driven quill element connectible with one of said stub drive connections, said quill element having a belt drive with said generator, a field coil for said slip coupling, a circuit incorporating in series a constant voltage source, said generator, said field coil and a torque-limiting resistance, said generator being connected in voltage opposition with said source and having a shunt field coil connected in series with a speed-control resistance, said generator having a steeply rising voltage-speed characteristic according to which maximum voltage builds up over a speed range substantially less than the total effective speed range at substantially constant current output of the generator.

2. A power transmission made according to claim 1, wherein said speed control and torque-limiting resistances are adjustable.

3. A power transmission made according to claim 1, including an undervoltage relay having a coil connected in parallel with said shunt field coil adapted upon stalling of said driven apparatus to open the circuit to the respective prime mover.

4. A power transmission made according to claim 3, wherein a resistance is included in series with said undervoltage relay coil.

5. A power transmission made according to claim 1, wherein the speed control, torque-limiting and undervoltage relay resistances are adjustable.

6. An electromagnetic slip coupling adapted for convenient and rapid attachment to stub shafts of machinery having such; comprising a central driven member constituted by a quill having an opening at one end for slipping over such a stub shaft, said quill incorporating keying means and having a first sheave adjacent said open end, the other end of said quill having a holding member, the latter adapted to be held by a bolt threaded into the end of said shaft, a driving member having a rotary sleeve mounting on the quill near said sheave, a field member mounted on one of said members and an adjacent inductor member mounted upon the other member, said field and inductor members lying in a common plane adjacent the end of the quill having said holding member, said driving member including a second sheave located in a plane between the first sheave and the plane of said field and inductor members.

7. An electromagnetic slip coupling adapted for convenient and rapid attachment and detachment to and from stub shafts of machinery having such; comprising a central driven member constituted by a quill having an opening at one end for slipping over such a stub shaft, said quill incorporating keying means and having a first sheave adjacent said open end, the other end of said quill carrying an inductor part and being also open and adapted to receive a clamping member, the latter adapted to be held by a bolt threaded into the end of said shaft, a driving member carrying a field part in the plane of said inductor part and having a rotary sleeve permanently mounted on the outside of said quill and adjacent to said sheave, said driving member including a second sheave located on said sleeve in a plane between the first sheave and the plane of said field and inductor member and including collector rings on the outside of said sleeve.

References Cited in the file of this patent

UNITED STATES PATENTS

| Number | Name | Date |
|---|---|---|
| 1,988,922 | Stephenson | Jan. 22, 1935 |
| 2,333,458 | Alexanderson | Nov. 2, 1943 |
| 2,357,201 | Hornbostel | Aug. 29, 1944 |
| 2,479,989 | Winther | Aug. 23, 1949 |
| 2,521,574 | Findley | Sept. 5, 1950 |

FOREIGN PATENTS

| Number | Country | Date |
|---|---|---|
| 544,941 | Great Britain | May 4, 1942 |